(No Model.)

D. RYLANDS.
INTERNALLY STOPPERED BOTTLE.

No. 376,916. Patented Jan. 24, 1888.

WITNESSES:

INVENTOR
Dan Rylands
BY
ATTORNEYS

UNITED STATES PATENT OFFICE.

DAN RYLANDS, OF STAIRFOOT, NEAR BARNSLEY, COUNTY OF YORK, ENGLAND.

INTERNALLY-STOPPERED BOTTLE.

SPECIFICATION forming part of Letters Patent No. 376,916, dated January 24, 1888.

Application filed July 21, 1887. Serial No. 244,904. (No model.)

*To all whom it may concern:*

Be it known that I, DAN RYLANDS, a subject of the Queen of Great Britain, residing at Stairfoot, near Barnsley, in the county of York, England, have invented new and useful Improvements in Internally-Stoppered Bottles, of which the following is a specification.

My invention relates to improvements in internally-stoppered bottles which have valves in their necks, by which means the said bottles can be opened; and the objects of my improvements are to improve upon my previous patents taken out for the said class of bottles. I attain these objects by constructing and manufacturing the said bottles in the manner herein described and illustrated in the accompanying drawings, in which—

Figure 1:
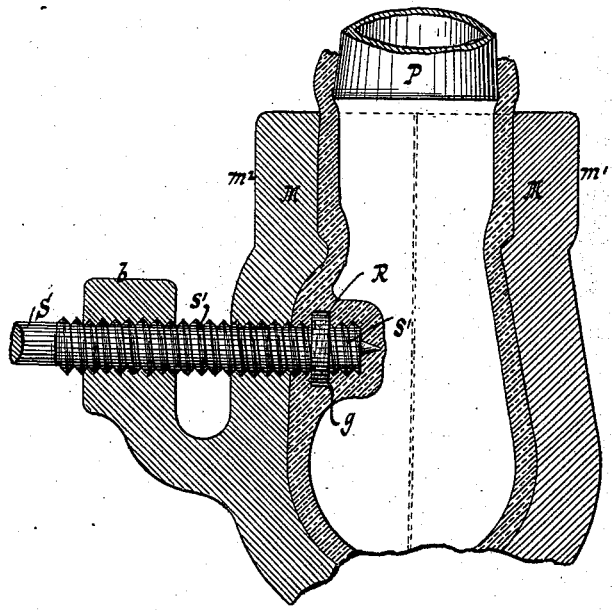
Figure 2:
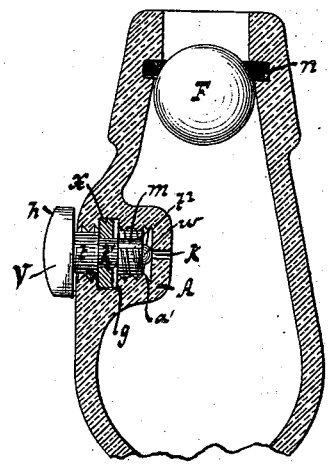

Figure 1 is a sectional elevation of top portion of the mold wherein the bottle is blown, and shows a section of the neck of one form of improved bottle blown therein and connected to an ordinary blow-pipe, P. Fig. 2 is a sectional elevation of improved bottle-neck, showing my improved valve fitted therein.

The mold and spindle shown in Fig. 1 are not part of the invention which I seek to patent by this present application, but they are the subject of a pending application, Serial No. 232,298, filed March 24, 1887, in the United States Patent Office. They are shown here, however, for the purpose of explanation and to enable me to illustrate with more clearness my invention in bottles herein described and claimed.

Referring to Fig. 1, the mold M is made in two portions, $m'$ $m^2$, which are hinged together at the bottom in the ordinary manner. In connection with the said mold M is a spindle, S, a portion, $s'$, of which is threaded and screws through a boss, $b$, which can be attached to the part $m^2$ of mold M, as shown, or attached to any other suitable article. When the mold M is prepared for receiving the viscous or molten glass for forming the bottle, the threaded end $s'$ of the spindle S projects a suitable distance within the mold M, and on this projecting portion $s'$ of the spindle S is placed (in a suitable position) a ring of asbestus or other suitable substance, R. The viscous or molten glass attached to the end of the blow-pipe P, and which has been worked up on the "marver" to a suitable shape by the blower, is then placed in the mold M in the usual way, after which the halves $m'$ $m^2$ of the mold M are closed, and then the bottle is blown up in the mold M, as shown. The spindle S is then caused to revolve (by any suitable mechanical means) in a direction which unscrews it from the mold M. In so doing it leaves the ring of asbestus or other substance, R, within the indent A, which the end of the screwed portion $s'$ has formed. The bottle is then taken from the mold M and handed to the bottle-maker, who forms a mouth thereon and punches the hole $k$ through the bottom of the indent A by means of suitable tools. It is subsequently annealed, after which the ring R is removed from the indent A. By this means a suitable groove or under-cut, $g$, is formed within the said indent A.

Referring to Fig. 2, the valve V is preferably made of glass, and has a square or other head, $h$, and a stem which has a portion, $t$, a recessed portion, $t'$, and an enlarged portion, $t^2$, which is formed with suitable male threads to correspond with the female threads $a'$ formed in the indent A. This enlarged portion $t^2$ has any suitable number of horizontal slots, $m$. At the bottom of the portion $t^2$ is placed an india-rubber or other flexible ring or ball, $w$. Before the valve V is screwed into the indent A an india-rubber or other pliable washer, $x$, is placed onto the recessed portion $t'$, and the flexible washer or ball $w$ is also placed at the bottom of the portion $t^2$. The valve V is then screwed into the indent A, and the pliable washer $x$ is pressed in along with the valve V until it arrives at the groove or under-cut $g$, when it expands and fits itself into said groove $g$. The valve V is then fitted complete in the indent A, and cannot be entirely unscrewed or drawn from said indent A. By giving the head $h$ of the valve V an unscrewing twist the ball or washer $w$ is withdrawn or forced by means of the pressure in the bottle from the hole $k$. By this means the pressure of gas in the bottle escapes out of said hole $k$ and passes along the oblong slots $m$, after which it passes out of the indent A and escapes between the head $h$ and the bottle-neck.

I would have it well understood that the valve V, hereinbefore described, is for the purpose of being used in combination with internally-stoppered bottles whose stoppers are either globular or any other shape.

By means of the arrangement herein described and illustrated internally-stoppered bottles can be opened without the aid of an opener, and the internal-stoppers, F, released from their seatings n without the application of any external mechanical force.

To open bottles fitted with valves, as shown at Fig. 2, the said valve V is turned by the hand in an unscrewing direction. By this means the internal gas under pressure escapes out of the hole K, when the internal stopper, F, falls, and then the contents can be poured out. When it is required to refill the bottles, the valve V must be screwed up so that the washer w hermetically seals the hole K.

What I claim as new, and desire to secure by Letters Patent, is—

1. In connection with an internally-stoppered bottle, the indent A, provided with a hole, K, communicating with the interior of the bottle, in combination with valve V, adapted to work in the indent and to close or open the hole K, so as to allow the gas or air in the bottle to escape through the valve at pleasure, the valve being secured to the indent by washer X, resting in a groove, $g$, in the indent and a recess, $t'$, in the valve-stem, substantially as shown and described.

2. In connection with an internally-stoppered bottle having an indent, A, provided with a groove, $g$, and hole K, a valve, V, made with portions $t\ t'\ t^2$, with slots M, and a head, $h$, for screwing and unscrewing, and having a washer, X, and washer W, substantially as shown and described.

In testimony whereof I have hereunto set my hand and seal in the presence of two subscribing witnesses.

DAN RYLANDS. [L. S.]

Witnesses:
 THOMAS JOHNSON,
 AARON BOSTWICK.